United States Patent [19]

Khan et al.

[11] 4,307,790
[45] Dec. 29, 1981

[54] WEIGHT-DROP SEISMIC EXPLORATION SYSTEM

[75] Inventors: Tawassul A. Khan, Cypress; David F. Kratochvil, Sugarland, both of Tex.

[73] Assignee: Geosource Inc., Houston, Tex.

[21] Appl. No.: 891,276

[22] Filed: Mar. 29, 1978

[51] Int. Cl.³ .......................... G01V 1/14; G01V 1/26
[52] U.S. Cl. ..................................... 181/121; 181/111; 367/23; 367/41; 367/77
[58] Field of Search .................. 340/7 R, 9, 15.5 TG, 340/15.5 TS, 15.5 TC, 15.5 DP; 346/33 C, 29, 44; 181/111, 121; 325/53, 55; 367/23, 59, 63

[56] References Cited

U.S. PATENT DOCUMENTS

| | | | |
|---|---|---|---|
| 3,277,439 | 10/1966 | Riggs et al. | 346/33 C |
| 3,277,977 | 10/1966 | Silverman | 340/15.5 TG |
| 3,406,777 | 10/1968 | Bemrose | 181/111 |
| 3,687,218 | 9/1972 | Ritter | 340/7 R |
| 3,806,864 | 4/1974 | Broding et al. | 340/15.5 TS |
| 3,886,494 | 5/1975 | Kostelniczk et al. | 340/15.5 TS |
| 3,902,161 | 8/1975 | Kiowski et al. | 325/58 |
| 3,946,357 | 3/1976 | Weinstein et al. | 340/15.5 TS |

FOREIGN PATENT DOCUMENTS 779485 2/1968 Canada ...................... 340/15.5 TG

*Primary Examiner*—Nelson Moskowitz
*Attorney, Agent, or Firm*—Arnold, White & Durkee

[57] ABSTRACT

A method of seismic exploration and a system which provides the capability for increasing the number of depth points from which seismic data are acquired are disclosed. This increase in data is realized without increasing the number of recording channels or the number of geophone stations employed in the system. A higher common depth point multiplicity is achieved by separating energy sources in relation to geophone stations. The recording system is capable of automatically sorting out the data from different energy sources and storing it in different blocks of a memory. Since substantially all available recording time is fully utilized by using energy sources to their optimum efficiency, higher common-depth-point multiplicity can be achieved with minimum field costs.

20 Claims, 3 Drawing Figures

WEIGHT-DROP SEISMIC EXPLORATION SYSTEM

BACKGROUND OF THE INVENTION

1. Field of the Invention

This invention relates to seismic exploration, and, more particularly, to method and apparatus for simultaneously obtaining data from a multiplicity of common depth points.

2. Description of the Prior Art

In seismic exploration, seismic waves are commonly used to probe the earth's crust as a means of determining the type and location of subsurface formations. The earth's crust can be considered a transmission medium or filter of whose characteristics are to be determined by passing seismic waves through that medium. In the reflection seismic method, seismic waves or impulses are generated at a point at or near the earth's surface, and the compressional mode of these waves is reflected from subsurface accoustic impedance boundaries and detected by arrays of seismic detectors located on the earth's surface. The seismic detectors convert the received waves into electrical signals which are sensed and recorded in a form which permits analysis. Skilled interpreters can discern from such an analysis the shape and depth of subsurface reflection boundaries and the likelihood of finding an accumulation of minerals, such as oil and gas.

Various sources of seismic energy have been utilized in the art to impart the seismic waves into the earth's crust. These sources commonly employ an impulse type of seismic energy, which may comprise one or a series of pulses which are transmitted into the earth over a period of time. This transmission time is followed by a period of time for receiving the reflected waves. Common examples of such seismic energy sources are dynamite and a vibrating source of input signal.

Another type of source of seismic energy which has been utilized is the weight-drop system. This technique involves the dropping of a heavy weight from a truck at periodic intervals. However, the weight-drop seismic input system has not been utilized extensively due to the fact that efficient utilization of available recording time has not been made. This is due to the fact that in the past droptones were transmitted via radio to initiate each weight drop from each truck that was being used. This technique consumed valuable recording time with the radio transmission, and it is believed that up to 40% of recording could be lost. An example of such a system is disclosed in U.S. Pat. No. 3,902,161 to Kiowski, which discloses a radio transmission synchronization technique.

Another example of a synchronization technique is illustrated in U.S. Pat. No. 3,733,584 to Pelton. This technique involves bringing control units close enough to effect electrical transmission between them. Clocks in the control units are synchronized, and thereafter the control units are utilized to control the activation of seismic sources. However, it is believed that some sort of voice communication is required between the master and remote station to program times at which the sources are to be activated. The time required for this voice communication decreases the available recording time.

Accordingly, it is desirable to have a system for synchronizing and operating multiple energy source which makes efficient use of available recording unit. This useful result has been achieved by the method and apparatus of the present invention.

SUMMARY OF THE INVENTION

In accordance with the present invention, a seismic exploration system is provided which employs a plurality of source units, each having a programmed sequencer to control the activation of the source units. The sources are activated in a time sequence equal to the record interval time plus a fixed short delay. A single radio command is required to initiate the activation sequence, and the number of activations which are made by each unit is controlled by information which is programmed into the sequence at each unit. In one embodiment of the present invention, the source units comprise weight-drop apparatus.

In one embodiment of the present invention, the number of source units in the system, the unique sequential number assigned to a particular source, the record length in seconds, and the total number of drops which a particular source is to make are programmed into the controller. Following receipt of a start command, the weight at each source unit is dropped in sequence, and this sequential dropping continues until the weight has been dropped a number of times equal to the programmed input. At this time, the source units may be moved to a new input location, and the above process may be repeated.

With the apparatus and method of the present invention, three-dimensional recording of data may be accomplished by having the source units move in line with the arrays of seismic detectors at spaced intervals from the seismic detectors. Data recovered as a result of the weight drop at each unit is stored in a portion of a mass memory system and the data in each portion corresponds to that source which generated the data. When the data are processed, three dimensional contours of the subsurface formation may be obtained from the data.

DESCRIPTION OF SPECIFIC EMBODIMENTS

It will be appreciated if the present invention can take many forms and embodiments. An embodiment of the invention in a weight-drop system is described so as to give an understanding of the invention. It is not intended, however, that this illustrative description should in any way limit the true scope and spirit of the invention.

Figure 1:
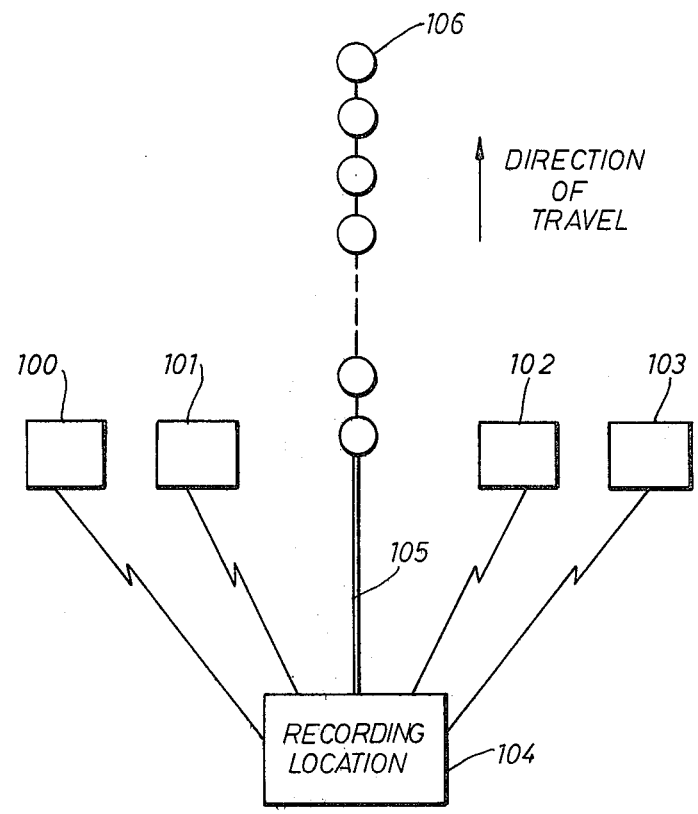
FIG. 1 is a block diagram which illustrates one configuration of a seismic exploration system in accordance with the present invention.

Referring now to FIG. 1, there is illustrated a seismic exploration system comprising source units 100–103, recording location 104, seismic stringer 106 and seismic cable 105. Seismic stringer 106 comprises a plurality of seismic detectors which are arranged in groups or nests, and there are a sufficient number of such groups to permit the recording of multiple channels (e.g., 48) of information. Seismic cable 105 connects the outputs of the groups of the seismic detectors in stringer 106 to a recording station 104.

Source units 100–103 are preferably vehicles which are equipped with weight-drop apparatus and a sequencer (not shown in FIG. 1) for controlling the dropping of the weight. When a weight is dropped by one source unit, e.g., source unit 100, seismic waves are imparted to the earth's surface and the seismic detectors in stringer 106 produce an output in response to that portion of the waves reflected from subsurface boundaries. These output signals are conveyed from the seismic detectors in stringer 106 to the recording equipment (not shown) located at recording location 104. Various techniques may be utilized to record these output signals, and these techniques are well known to those skilled in the art. The recorded data are later put in a form which permits analysis, and, as described above, skilled interpreters can discern from this analysis the depth and formation of the subsurface boundaries.

In operation, the sequencer in each source unit 100–103 is programmed with the number of source units in the system, the sequence in which that unit is to drop its weight, the length of time the data will be recorded subsequent to its weight being dropped (the record interval time), and the total number of drops which that source is to make at each shot point. Upon receipt of a starting command from recording station 104, the sequencer in each source unit 100–103 is initialized and a digital clock is enabled. Subsequent to receipt of the starting command, the source unit which is first in the sequential dropping order, e.g., source unit 100, drops its weight. Data are recorded by recording station 104 in response to this weight-drop. After the record interval time plus a short delay, e.g., 512 msec, has expired, the source unit which is second in the sequential dropping order, e.g., source unit 101, drops its weight. This process of the sequential dropping of weights continues until each source unit has dropped its weight in sequence the prescribed number of times. Of course, it is preferable that all sequencer in source units 100–103 be programmed to drop their weights an identical number of times.

If more data are required from the initial shot points, each sequencer in source units 100–103 may be re-programmed in the manner described above and the process may be repeated. If, however, sufficient data have been received from a given shot point, source units 100–103 may travel to new shot points in the direction of travel indicated in FIG. 1. After reaching that shot point, the above-described weight-drop process is repeated.

Still referring to FIG. 1, it will be apparent to those skilled in the art that data will be obtained from subsurface formations which are located under four points on the surface of the earth. In the case of source unit 100, data are recovered from subsurface formations which are located under the point which is equidistant between source unit 100 and stringer 106; in the case of source unit 101, data are recovered from subsurface formations which are located under the point equidistant between source unit 101 and stringer 106; etc. Accordingly, primary reflections are recovered from four such points. Of course, it is preferable that source units 100–103 be equally spaced from one another.

Since primary reflections are received by the seismic detectors in stringer 106 from subsurface formations underlying four points on the earth, the seismic exploration system illustrated in FIG. 1 is especially adaptable for use in the generation of three-dimensional data. The storage device in recording unit 104 is preferably a solid-state mass memory unit which is obtainable from several sources. One such source is Geosource Inc., the assignee of the present invention. This type memory unit may be partitioned, such that data received from the dropping of the weight at source unit 100 is stored in a first portion of the memory, the data received from source unit 101 is stored in a second unit of the memory, etc. Accordingly, the data available in the mass memory after weights have been dropped at each shot point includes the data from the subsurface formations underlying the four points on the earth. These data may then be transferred to a suitable recording device, e.g., a digital tape recorder.

Figure 2:
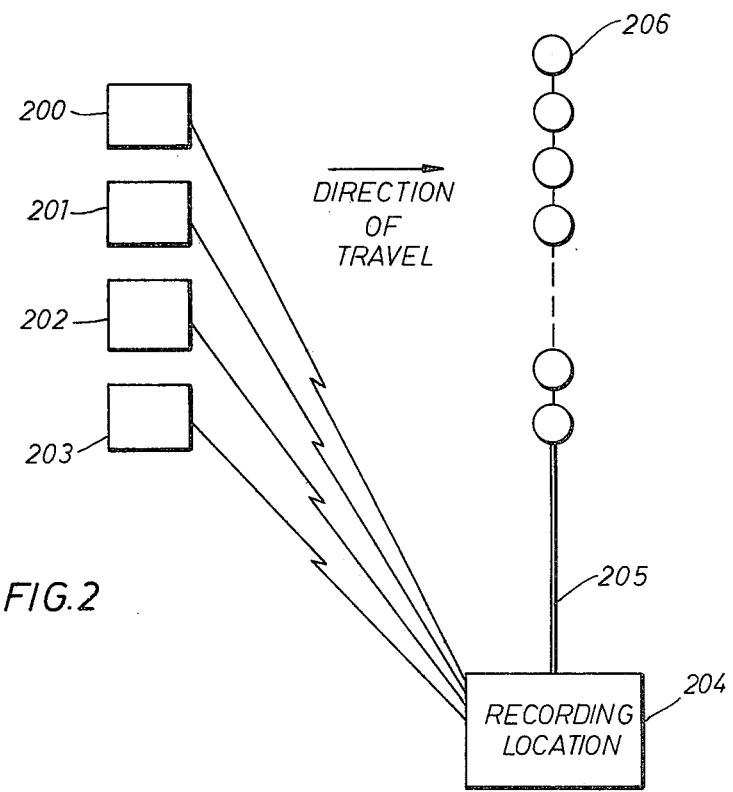
FIG. 2 is a block diagram which illustrates another configuration of a seismic exploration system in accordance with the present invention.

Now referring to FIG. 2, there is illustrated another configuration of a seismic exploration system in accordance with the present invention. As shown, it comprises source units 200–203, recording location 204, seismic stringer 206 and seismic cable 205. These elements are similar in construction and operation to the corresponding elements shown in FIG. 1.

In the FIG. 2 configuration, however, source units move in a direction substantially perpendicular to the line defined by seismic stringer 206. Accordingly, seismic data are acquired from subsurface formations underlying points equidistant between the source units and the line defined by stringer 206.

Figure 3:
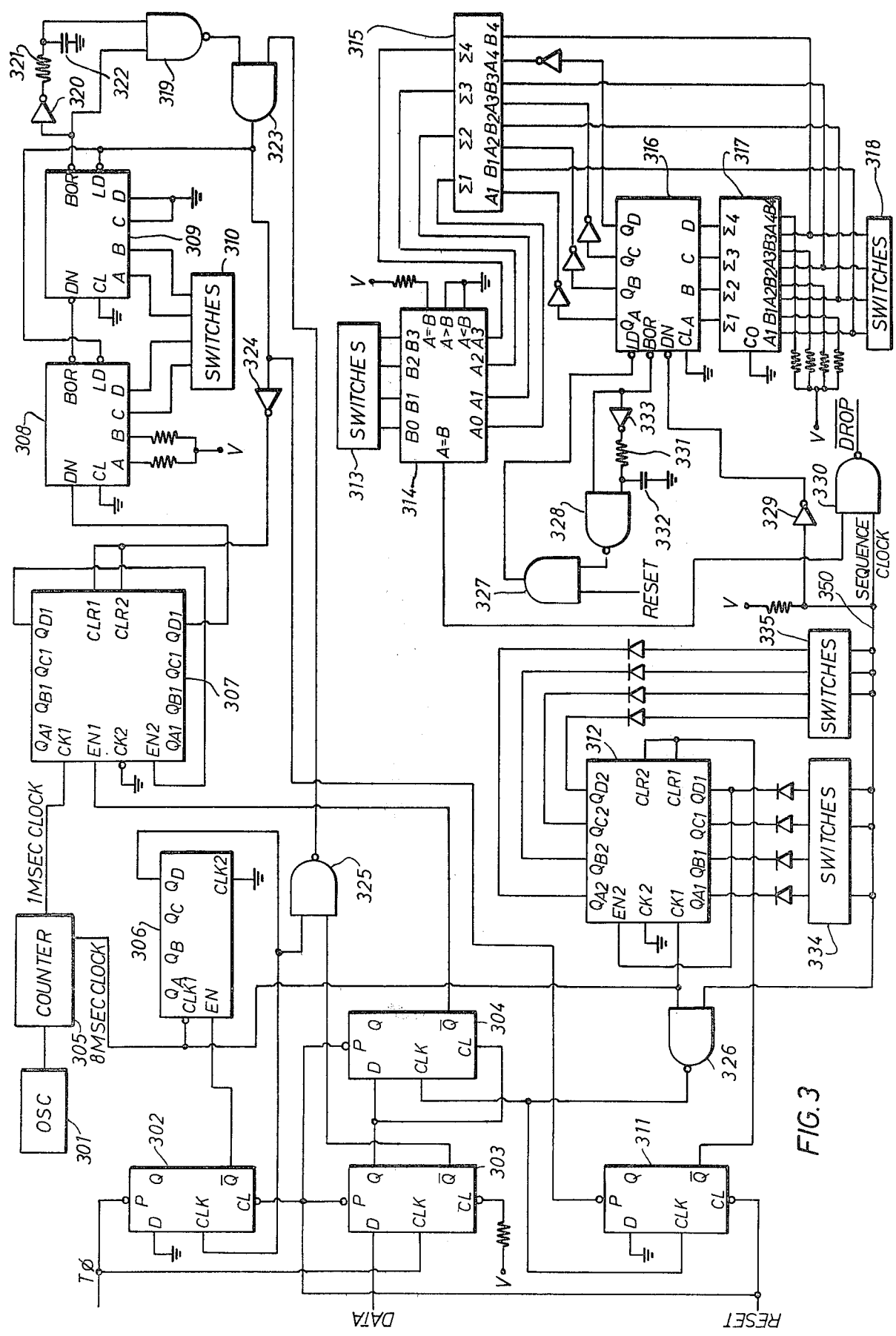
FIG. 3 is an electrical schematic diagram which illustrates a preferred configuration of the sequencer which is utilized to control the activation the source units illustrated in FIG. 1.

Now referring to FIG. 3, there is illustrated a configuration of the sequencer which is utilized in source units 100–103 (FIG. 1) in a preferred embodiment of the present invention. This sequencer comprises oscillator 301, flip-flops 302–304, counters 305–309, input switches 310, flip-flop 311, counter 312, input switches 313, comparator 314, adder 315, counter 316, adder 317, input switches 318, NAND gate 319, inverter 320, resistor 321, capacitor 322, AND gate 323, inverter 324, NAND gates 325–326, AND gate 327, NAND gate 328, resistor 331, capacitor 332, inverter 333, and input switches 334–335, all connected as shown.

In operation, the operator of the sequencer would program switch 310 to contain the record interval time. Also, the operator would program the number of source units in the system into switch 318. Further, the operator would program the sequential drop order of the particular source unit into switches 313. Switches 310, 313 and 318 are preferably rotary type switches with position encoding.

Oscillator 301 preferably has a frequency of 640 KHz, and counter 305 is utilized to derive two clocks, one having a period of 1 msec and the other having a period of 8 msec from the 640 KHz signal. In the preferred embodiment of the present invention, counter 305 comprises a TP4518 counter such as manufactured by Texas Instruments in cascade with a CD4040 counter such as manufactured by RCA.

For purposes of the following discussion, it will be assumed that operations with the system of FIG. 1 are commencing. At that time, recording station 104 transmits a radio signal which is received by radio apparatus (not shown) which is located in each source unit 100–103. Included in the information which is transmitted is a signal, which is designated as TO and DATA. Upon receipt of the signal TO, flip-flop 302 enables counter 306 and the signal appearing at the output of counter 305 increments the contents of counter 306.

Flip-flop 302 is preferably a 74C74, and counter 306 is preferably a TP4518, both of which are manufactured by Texas Instruments.

Also included in the information transmitted from the recording location is a bit designated in FIG. 3 as DATA. The logic value of the signal DATA is 0 if the controller is to commence operations, and, in this situation, the signal TO causes the complementing output of flip-flop 303 (which is preferably a 74C74) to assume a logic 1 state, which enables NAND gate 325 (which is preferably a 74C00).

Approximately 64 msec after receipt of the signal TO, the most significant bit of counter 306 assumes a logic 1 state, and a pulse is generated at the output of NAND gate 325. This signal is conveyed via AND gate 323 (which is preferably a 74C08) to the preset input of flip-flop 311 (which is preferably a 74C74), thereby causing the complemented output of flip-flop 311 to assume a logic 0 state and enabling counter 312 to be incremented. The signal at the most significant bit of counter 306 is also used to clock flip-flop 302, thereby resulting in counter 306 becoming disabled. Counter 312 is preferably a TP4518.

It is known to those skilled in the art that the time that it takes the weight-drop apparatus to fall to the earth from its raised position varies from source unit to source unit. Further, it is known that the weight should impact the earth in synchronism with the recording apparatus that is typically used in these systems. In order to achieve this synchronism, the weight is required to impact the earth within an interval of time equal to approximately 200 milliseconds, and this interval of time is dictated by the particular recording apparatus that is used.

Accordingly, the preferred configuration of the sequencer used at each source unit includes adjustment means for ensuring that the weight impacts the earth during the interval of time dictated by the recording apparatus. As shown in FIG. 3, this means includes flip-flop 311, counter 312 and switches 334 and 335 (which are preferably rotary type switches with position encoding). The pulse generated by NAND gate 325 upon detection of a start bit sets flip-flop 311, thereby enabling counter 312 to be incremented by the 8 msec clock generated by counter 305.

A fixed delay is programmed into switches 334 and 335, and the magnitude of this delay is determined by taking test-drops and monitoring the weight switch opening on the particular weight-drop apparatus. Prior to the time that the binary value of the outputs of counter 312 equal the preset contents of switches 334 and 335, the signal on common line 350 [hereinafter referred to as "sequence clock signal"] has a logic 0 value. However, when the binary value of the outputs of counter 312 equals the preset values in counters 334 and 335, sequence clock signal traverses from a logic 0 to a logic 1 state and remains in this logic 1 state for a period of time equal to approximately 4 msec.

Sequence clock signal is also coupled to one input of NAND gate 326, and, when in a logic 1 state NAND gate 326 is enabled. The next logic 1 portion of the 8 msec clock occurs approximately 4 msec after the sequence clock signal assumes a logic 1 state. At this time, NAND gate 326 produces a logic zero signal of approximately 4 msec duration, and flip-flop 311 is reset at the end of the logic zero output of NAND gate 326. The resetting of flip-flop 311 disables counter 312 and resets the outputs thereof to zero.

Sequence clock signal is also connected to one input of NAND gate 330, and the output of NAND gate 330 is utilized to issue a drop command to the weight-drop apparatus. This drop command is active when the second input to NAND gate 330 is also in a logic 1 state. As shown in FIG. 3, the second input to NAND gate 330 is connected to one output of comparator 314, which output assumes a logic 1 state at the time that the particular source unit is to drop its weight. This determination is made as follows.

A number equal to the number of trucks operating in the system is preset into switches 318. Adder 317 (which is preferably a 74C83) functions to subtract one from this number, and the result of this subtraction is initially loaded into counter 316 by the reset pulse. The logic value of each bit at the outputs of counter 316 is complemented by inverters 351 and presented to one set of inputs of adder 315. The second inputs to adder 315 are the logical values programmed into switch 318. Adder 315 functions, therefore, to subtract the values at the output of counter 316 from the value programmed into switch 318. The result of this subtraction appears at the outputs of adder 315, which are coupled to one set of inputs of comparator 314. The other set of inputs to comparator 314 are coupled to the outputs of switch 313, into which are programmed the sequential number of the particular source unit. When the two sets of inputs to comparator 314 are equal, the indicated output of comparator 314 enables NAND gate 330, thereby permitting sequence clock signal to initiate the drop command. The drop command is utilized by the weight-drop apparatus to permit the weight to impact the earth.

Still referring to FIG. 3, the detection of a start bit (a logic 0) on the DATA line causes flip-flop 304 to enable counter 307. Accordingly, the 1 msec clock output of counter 305 clocks counter 307. The signal appearing at the output of counter 307 decrements the contents of counters 308 and 309 which were initially loaded with a value equal to the seismic record interval by the pulse at the output of NAND gate 325. When the contents of counters 308 and 309 are fully decremented, inverter 320, resistor 321, capacitor 322 and NAND gate 319 function to generate a pulse at the output of NAND gate 319. This pulse is transmitted via AND gate 323 to the load inputs of counters 308 and 309, thereby causing the contents of counters 308 and 309 to be reloaded with a value equal to the seismic record interval length.

The pulse generated at the output of NAND gate 319 occurs after a period of time equal to the record interval length, and is transmitted via AND gate 323 to set flip-flop 311. Counter 312 is once again enabled, and the above-described process is repeated.

The hoist control unit (not shown) of the weight-drop apparatus includes a conventional counter which counts the number of drop commands which are issued to it. Also associated with the hoist control unit is a switch into which is programmed the number of drops that a particular unit is to make. When the unit has made the required number of drops, it generates a reset pulse to the sequencer, which inhibits further operation of the sequencer circuitry. In order to re-enable the circuitry, the sequencer must receive another start pulse from the recording location 104 (FIG. 1).

During the course of operations, it may be desirable to interrupt the operation of the sequencer at the source units. In this event, recording station 104 (FIG. 1) transmits a radio frequency signal from which is derived a stop pulse (a logic 1 on the DATA line) and a TO pulse.

Upon detection of the stop pulse, flip-flop 303 disables NAND gate 325, thereby inhibiting the signal produced at the output of counter 306 from passing through NAND gate 325. Since the stop command may be received at any time, it would be undesirable to terminate a drop sequence which is currently in progress. Accordingly, NAND gate 326 functions to terminate the drop sequence at the end of the next sequence clock signal.

The foregoing has provide a detailed explanation of the operation of a weight-drop system in accordance with the present invention. However, it has been found that the method and apparatus of the present invention can also be utilized with other types of seismic sources, e.g. Vibroseis* and Dynoseis**.

*Vibroseis is a registered mark of Continental Oil Co.
**Dynoseis is a registered mark of Sinclair.

With Vibroseis* sources, it is common for the sources to input energy into the earth for one period of time, e.g. 8 sec, which is followed by a second period of time, e.g. 4 sec, during which data are recorded. Accordingly, switch 310 could be programmed with a value which is greater than the sum of the times required for: (1) a source unit to input the vibrating energy; (2) recording of the data obtained in response to the input; and (3) travelling to a new location prior to the time that that source unit is to input seismic energy. The source unit would be in its new location when its sequencer generated a new activation command.

Accordingly, it is seen that the method and apparatus of the present invention permits efficient utilization of recording time, regardless of the seismic source employed.

What is claimed is:

1. A method of seismic exploration comprising the steps of:
    establishing a plurality of source units at locations of the earth's surface, each said source unit including weight-drop apparatus and a sequencer for controlling the dropping of said weight;
    transmitting a starting signal to each said source unit to synchronize said sources; and
    using the sequencers to sequentially activate each source unit to drop its weight by programming each sequencer with the number of source units in the system, the sequential number of that source unit, and the record interval length, generating a first sequence clock signal subsequent to the receipt and decoding of the starting signal, and using the first sequence clock signal to generate a drop command in the source unit which is first in the sequential drop order, said sequential activation beginning subsequent to the receipt of the starting signal at the first source unit and continuing at substantially equally spaced time intervals thereafter, the time intervals between activations being substantially equal to the record interval time.

2. The method of claim 1, wherein it additionally comprises the step of recording data obtained in response to each drop of the weight at each source unit.

3. The method of claim 2, wherein four source units are established at locations on the earth and the data obtained in response to the sequential dropping of the weights of the source units are simultaneously composited.

4. The method of claim 1 further comprising the steps of:
    generating a set of sequence clock signals at substantially equally spaced time intervals after the first sequence clock signal; and
    using this set of sequence clock signals to generate a drop commands at a source unit when its sequential number is reached.

5. The method of claim 4, wherein it further comprises the steps of:
    transmitting a stop command to the souce units;
    receiving and decoding the stop command; and
    terminating further activation of the weight drops after generation of that sequence clock command following receipt of the stop command.

6. A method of seismic exploration comprising the steps of:
    establishing a plurality of source units at locations on the earth's surface, each said souce unit including apparatus for inputting seismic energy into the earth and a sequencer for controlling the activation of said source;
    transmitting a starting signal to each said source unit to synchronize said sources; and
    using the sequencers to sequentially activate each source of seismic energy by programming each sequencer with the number of source units in the system, the sequential number of that source unit, and the record interval time, generating a first sequence clock signal subsequent to the decoding of the starting signal, and using the first sequence clock signal to generate an activation command in the source unit which is first in the sequential activation order, said sequential activation beginning subsequent to the receipt of the starting signal at the first source unit and continuing at substantially equally spaced time intervals thereafter, said time intervals between activations being substantially equal to the record interval time.

7. The method of claim 6, wherein it additionally comprises the step of recording data obtained in response to each activation of the source.

8. The method of claim 6, wherein four source units are established at locations on the earth and the data obtained in response to the sequential of the sources are simultaneously composited.

9. The method of claim 1 further comprising the steps of:
    generating a set of sequence clock signals at substantially equally spaced time intervals after the first sequence clock signal; and
    using this set of sequence clock signals to generate an activation command at a source unit when its sequential number is reached.

10. The method of claim 9, wherein it further comprises the steps of:
    transmitting a stop command to the source units;
    receiving and decoding the stop command; and
    terminating further activation of the sources after generation of that sequence clock command following receipt of the stop command.

11. Apparatus for use in a seismic exploration system, comprising:
    a plurality of source units which are located at spaced intervals along the earth's surface;
    means for transmitting a starting signal to each source unit; and
    a sequencer in each source unit which decodes the starting signal and which generates sequential activation commands at substantially equally spaced time intervals after the starting signal, said time intervals being substantially equal to the record interval time.

12. The apparatus of claim 11, wherein it comprises four source units.

13. The apparatus of claim 11, wherein the sequencer includes:
   switches for programming the number of source units in the system, the sequential number of that source unit and the record interval length;
   circuitry for generating a first sequence clock subsequent to the decoding of the start signal; and
   circuitry for generating a drop command at the source unit which is first in the sequential drop order.

14. The apparatus of claim 13, wherein the sequencer further comprises:
   circuitry for generating a set of sequence clock signals at substantially equally spaced time intervals after the first sequence clock signal; and
   circuitry for generating a drop command at a source unit with a sequence clock signal when the sequential number of that unit is reached.

15. The apparatus of claim 14, further comprising:
   circuitry in each source unit for decoding a stop command; and
   circuitry which terminates the generation of further drop commands after generation of that sequence clock command which occurs after receipt of the stop command.

16. Apparatus for use in a seismic exploration system, comprising:
   a plurality of source units which are located at spaced intervals along the earth's surface;
   means for transmitting a starting signal to each source unit; and
   a sequencer in each source unit which decodes the starting signal and which generates sequential activation commands at substantially equally spaced intervals after the starting signal.

17. The apparatus of claim 16, wherein it comprises four source units.

18. The apparatus of claim 16, wherein the sequencer includes:
   switches for programming the number of source units in the system, the sequential number of that source unit and the record interval length;
   circuitry for generating a first sequence clock subsequent to the decoding of the start signal; and
   circuitry for generating an activation command at the source unit which is first in the sequential order.

19. The apparatus of claim 18, wherein the sequencer further comprises:
   circuitry for generating a set of sequence clock signals at substantially equally spaced time intervals after the first sequence clock signal; and
   circuitry for generating an activation command at a source unit with a sequence clock signal when the sequential number of that unit is reached.

20. The apparatus of claim 19, further comprising:
   circuitry in each source unit for decoding a stop command; and
   circuitry which terminates the generation of further activation commands after generation of that sequence clock command which occurs after receipt of the stop command.

* * * * *

UNITED STATES PATENT AND TRADEMARK OFFICE
CERTIFICATE OF CORRECTION

PATENT NO. : 4,307,790
DATED : December 29, 1981
INVENTOR(S) : Tawassul A. Khan et al.

It is certified that error appears in the above—identified patent and that said Letters Patent is hereby corrected as shown below:

Column 7, line 37, "of", second occurrence, should read -- on --.

Column 8, line 4, delete "a".

Column 8, line 17, "souce" should read -- source --.

Column 8, line 43, after "activation" insert -- sequential --.

Column 8, line 45, claim 9 should depend from claim 7 instead of claim 1.

Signed and Sealed this

Sixth Day of July 1982

[SEAL]

Attest:

GERALD J. MOSSINGHOFF

Attesting Officer    Commissioner of Patents and Trademarks